United States Patent [19]

Epstein

[11] Patent Number: 4,498,239
[45] Date of Patent: Feb. 12, 1985

[54] FEELER GAGE MOUNTING SYSTEM

[75] Inventor: Harry Epstein, Seaford, N.Y.

[73] Assignee: Kastar, Inc., Bellport, N.Y.

[21] Appl. No.: 491,368

[22] Filed: May 19, 1983

[51] Int. Cl.³ .............................................. G01B 3/32
[52] U.S. Cl. .................................................. 33/168 R
[58] Field of Search ........... 33/168 R, 174 H, 181 AT

[56] References Cited

U.S. PATENT DOCUMENTS

| | | | |
|---|---|---|---|
| 987,703 | 3/1911 | Curtin | 33/168 R |
| 1,524,474 | 1/1925 | Buck | 33/168 R |
| 1,661,701 | 3/1928 | Michler | 33/168 R |
| 2,237,378 | 4/1941 | Thienemann | 33/168 R |
| 2,498,171 | 2/1950 | Michler | 33/168 R |
| 3,063,153 | 11/1962 | Stites | 33/168 R |
| 3,816,010 | 6/1974 | Di Rago | 33/168 R |

FOREIGN PATENT DOCUMENTS 265233   2/1950   Switzerland ..................... 33/168 R Primary Examiner—Richard R. Stearns
Attorney, Agent, or Firm—Lackenbach Siegel Marzullo Presta & Aronson

[57] ABSTRACT

A feeler gage mounting system comprising a case having a pair of opposed walls, a pin having an elongated pin body having opposed first and second ends, the first end being non-rotatably affixed to one of the walls of the case. The second end of the pin is connected to the other case wall. A plurality of feeler gage blade members are removably rotatably connected at two circular holes to the pin body. The pin body forms a key and the blade members form keyway sheets leading to the circular holes, the keyway slots being adapted to receive the pin body so that the blade members can be mounted onto or removed from the pin body at a particular angle at which the key of the pin body is positioned.

9 Claims, 13 Drawing Figures

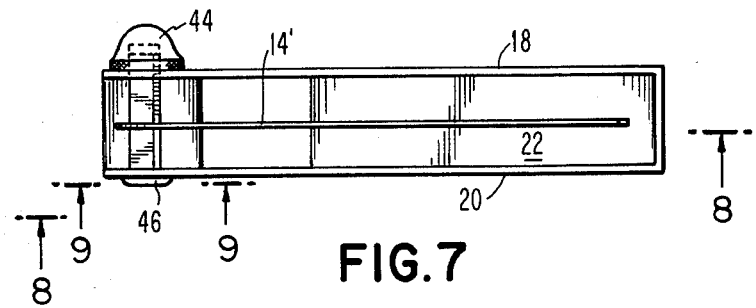
FIG. 7
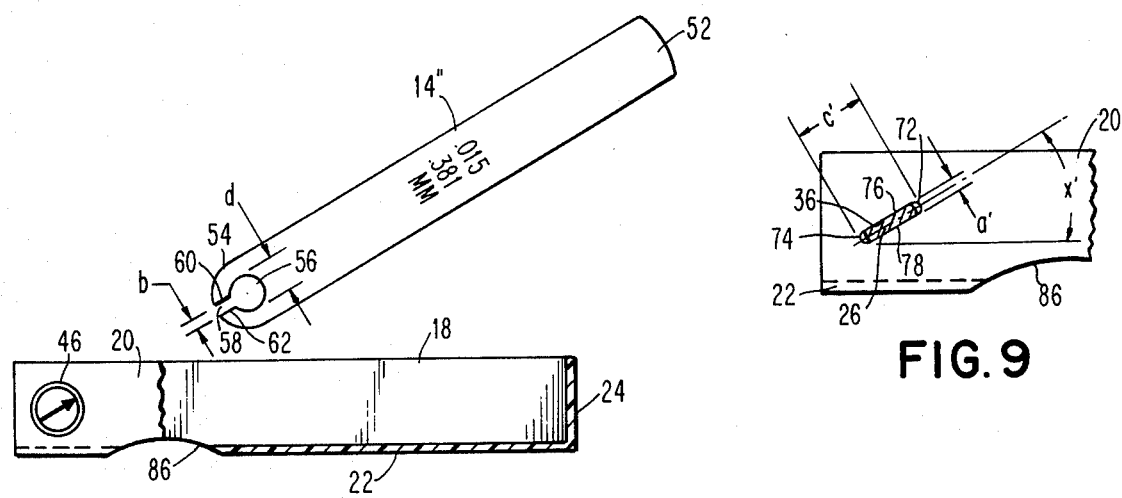
FIG. 9
FIG. 8
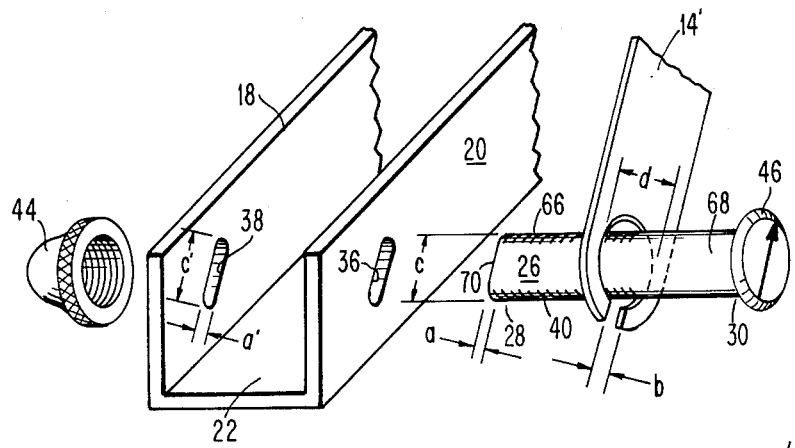
FIG. 10
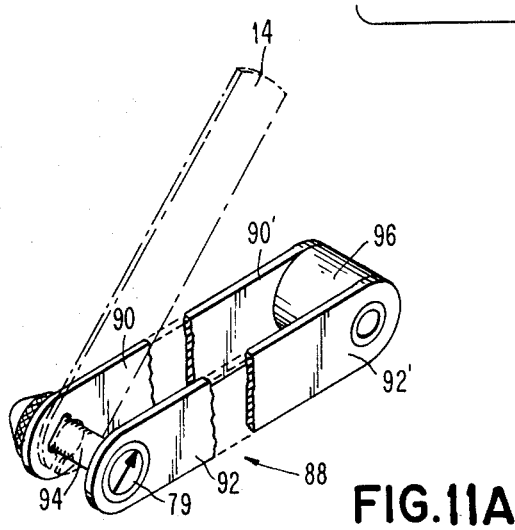
FIG. 11A
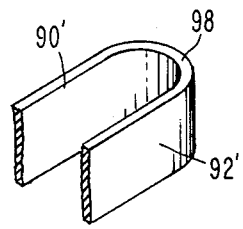
FIG. 11B

FEELER GAGE MOUNTING SYSTEM

BACKGROUND OF THE INVENTION

This invention relates generally to feeler gage holders and more specifically to a system for removably mounting feeler blades onto a holder.

Conventionally, feeler gages are generally rotatably and permanently connected to a pin that is in turn connected to a holder. This construction has the disadvantage of forcing the user to change to a completely new holder unit in order to gain particular access to blade members which may be removably mounted. Such a feeler gage is more convenient to use where one must employ a combination of blades to size or "gap" a space, and where there is a need to remove one or more blades for a particular application.

However, holder devices that allow removal and substitution of blades are known. For example, U.S. Pat. No. 3,816,010 discloses a relatively complicated feeler gage arrangement in which blades of varying thicknesses may be inserted and removed from a holder. The blades are stacked on a fixed pin threaded at one end. A sleeve is freely slidable along the length of the pin and is threaded at one end to mate with the thread of the pin. The blades are securely held by the sleeve when the internal thread of the sleeve mates with the thread of the pin. A spring rapidly releases the sleeve from the pin and thereby releases the blades from the sleeve when the sleeve is unthreaded from the pin.

A disadvantage of the device described in the U.S. Pat. No. 3,816,010 that sleeve 22 with head 22a and spring 26 add to the cost of production. In addition, when the spring 26 urges the sleeve 22 outwardly, all of the blades are instantly released such that they are free to scatter and fall off and away from the pin. Thus, there is a need for a feeler gage which is capable of releasing one or more selected blades without fear of all the blades being simultaneously released.

SUMMARY OF THE INVENTION

Accordingly, it is an object of the present invention to provide a feeler gage mounting system that allows a user to easily remove feeler gage blades and to replace them as is needed with with a minimum of ease.

It is another object of the present invention to provide a system for removably mounting feeler gage blades to a pin connected to a case.

It is yet another object of the present invention to provide a system for removably mounting feeler gage blades having a keyway to a pin having a key that fits into the keyway.

It is a further object of the present invention to provide a system for removably connecting feeler gage blade members to a pin mounted transversely between to opposing arms of a case adapted to hold a plurality of blades, the case having a bottom wall and a rear wall opposite the pin.

It is yet another object of the present invention to provide a keyway to a circular mounting hole of a feeler gage blade member and a cross-pin configured as a key adapted to slide into the keyway of the blade member until the key reaches the mounting hole where the key becomes the pin about which the blade members rotate, or until the key passes from the keyway of the blade member, which then can be removed from the case holding the plurality of blade members.

It is yet another object of the present invention to provide a pin that acts as an oblong key, the key being positioned at a selected angle rotative to the bottom wall of the case, so that blade members can be removed from or placed onto the pin at the selected angle.

Accordingly, in order to achieve the above objects, as well as others that will become apparent hereafter, a system for removably mounting feeler gage blades in accordance with the present invention is described below. The system includes a case having a pair of opposed walls and a pin having an elongated pin body having opposed ends, at least one end being non-rotatably affixed to one of the opposed walls. Also included is a means for connecting the other end of the pin body to the other of the opposed walls of the case. A plurality of blade members are rotatably connected to the pin body. The blade members form keyways to receive a key portion of the pin body. The keyways extend between end portions of the blades and circular holes formed through in the blade members that are adapted to receive the pin body. The blade members can be rotatably mounted with the pin body or removed from the pin body at the option of the user. The case includes a bottom wall secured to the pair of opposed side walls and a rear wall secured to the side and bottom walls. The end portion of the walls of the case opposite the rear wall forms a passage in one of the walls and a threaded hole in the other wall opposite the passage to accept the ends of the pin. The passage is adapted to snugly receive one end of the pin body, which has two pair of opposed sides, at least one of the pair of opposed sides being planar. The planar sides being distanced closer together than the maximum distance between the planar sides. The keyways are slots formed by each of the blade members, the slots joining the end portions of the blade members with the holes, with the opposing planar surfaces being spaced at a distance slightly greater than the pair of planar sides of the key of the pin body.

The present invention will be better understood and the objects and important features, other than those specifically enumerated above, will become apparent when consideration is given to the following details and description, which when taken in conjunction with the annexed drawing, describes, discloses illustrates, and shows a preferred embodiment or modification of the present invention and what is presently considered and believed to be the best mode of practice in the principles thereof. Other embodiments or modifications may be suggested to those having the benefits of the teachings herein and such other embodiments or modifications are intended to be reserved especially as they fall within the scope and spirit of the subjoined claims.

BRIEF DESCRIPTION OF THE DRAWINGS

FIG. 7 is a top view of the case of the present invention with one blade member partially extended from the case;
FIG. 8 is a view taken through line 8—8 of FIG. 7;
FIG. 9 is a view taken through line 9—9 of FIG. 7;
FIG. 10 is an exploded perspective view of the pin, blade member, and case;

FIG. 11A is an alternative embodiment of the case;

FIG. 11B is an end view of an alternative embodiment of the end of the case.

DESCRIPTION OF THE PREFERRED EMBODIMENT

Figure 2:
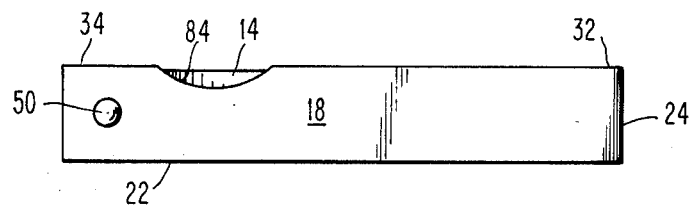
FIG. 2 is a top view of FIG. 1.
Figure 3:
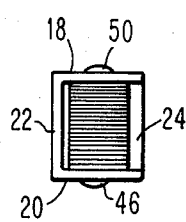
FIG. 3 is a left side elevational view of FIG. 1.
Figure 1:
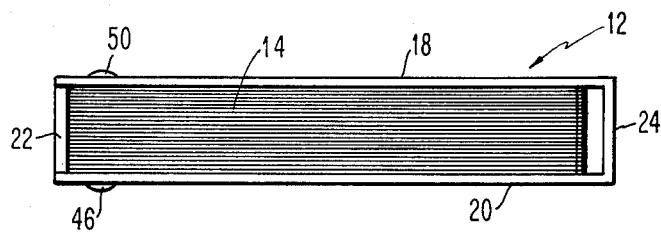
FIG. 1 is a top plan view of the invention.
Figure 4:
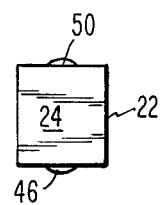
FIG. 4 is a right side elevational view of FIG. 1.
Figure 5:
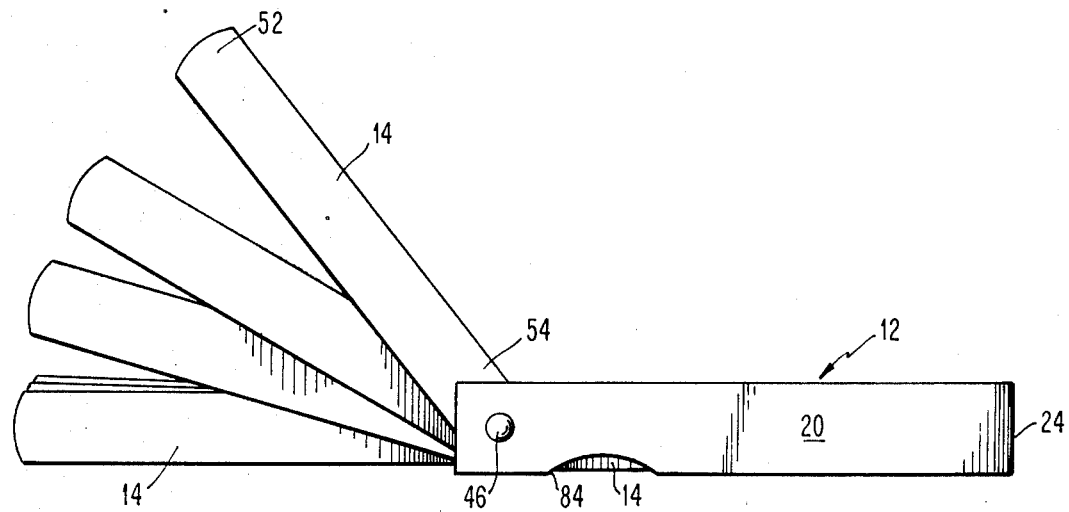
FIG. 5 is a bottom view of FIG. 1 with the blades extended.
Figure 6:
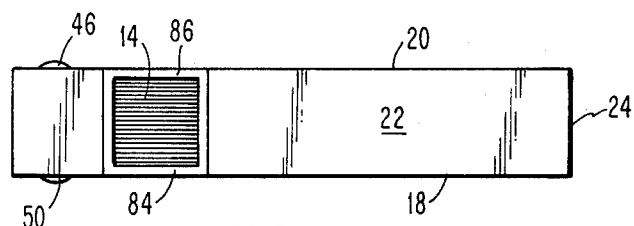
FIG. 6 is a bottom view of FIG. 5.

Reference is now made specifically to the drawings, in which identical or similar parts are designated by the same reference numerals throughout.

FIGS. 1-6 illustrate a feeler gauge mounting system including a case 12, that holds a plurality of feeler gage blade members 14 rotatably mounted, or connected, to a pin 16 as shown in FIGS. 7, 10 and 11. Case 12 includes a pair of flat, opposed arms, or walls, 18 and 20 that extend approximately at right angles from bottom wall 22 to which they are secured. A rear wall 24, which is secured to side walls 18 and 20, also extends at approximately right angles from bottom wall 22. Pin 16 includes an elongated pin body 26 that extends transversely between side walls 18 and 20. As seen in FIGS. 7 and 11, pin body 26 has opposed ends 28 and 30. End 28 is non-rotatably affixed to wall 20 and end 30 is connected to wall 18. Case 12 is elongated and has opposed case end portions 32 and 34. Rear wall 24 is positioned at case end portion 32. Side wall 20 forms a first passage 36 and opposed side wall 18 forms a second passage 38 that is positioned opposite first passage 36. First passage 36 and second passage 38 are located at case end portion 34. End 28 of pin body 26 extends through first and second passages 36 and 38. End 30 includes a threaded portion 40 that extends beyond the outer surface 42 of the side wall 18 and that is adapted to be threaded into blind nut 44, so that nut 42 can be screwed against outer surface 42. As will be discussed later, threaded portion 40 is preferably partially threaded at the outer surface of pin body 26.

Pin 16 as shown in FIGS. 7, 10 and 11, includes a hemispherical head 46 connected as one piece with end 28 and which is pressed against outer surface 48 of wall 20 when nut 44 is screwed onto threaded portion 40 of pin body 26 against outer surface 42 of side wall 18.

The opposed side walls 18 and 20 are preferably flexible so as to retain in place all of the blades at all times. Moreover, as nut 44 is secured on the pin, the flexible side walls 18 and 20 press inwards against the blade pack 14 so as to squeeze it between the side walls 18 and 20 for added security and retention of all blades, specifically when pin body or keyway 26 is aligned with slot or keyway 58.

At this point, it is to be noted that FIGS. 1-6 show an embodiment different from the embodiments shown in FIGS. 7-12 with regard to the means for connecting end 30 of pin body 26 to wall 18. FIGS. 1-6 illustrate a head 50 similar to head 46 positioned tightly against outer surface 42 of wall 42, rather than blind nut 44 as shown in FIGS. 7-13 and described above. Head 50 is adapted to be screwed onto threaded portion 40 in the same manner as nut 44 via a slot (not shown) adapted to accept the tip of a screwdriver.

A plurality of feeler gage blade members 14 is shown positioned in case 12 in the figures.

A plurality of feeler gage blade members are shown positioned in case 12 in the figures. As shown in FIGS. 5, 8, 11A and 12, some of the blades are shown extended from case 12. FIG. 8 indicates typical gage markings as "0.015" indicating inches and "0.381 mm" indicating 0.381 millimeters.

Each blade member 14 is, for purposes of illustration, a single blade member 14' as is shown in FIGS. 7, 8 and 10. Blade member 14', typical of all blade members 14, is a flat, elongated member having opposed blade end portions 52 and 54. Blade member 14' forms an approximately circular hole 56 spaced proximate to blade end portion 54; hole 56 is adapted to receive pin body 26 in rotatable association in a manner to be explained. Blade member 14' also forms a slot 58 at blade end portion 54 which opens at end portion 54 and joins hole 56. Slot 58 has a pair of opposed parallel planar surfaces 60 and 62 spaced apart at a distance b.

Pin body 26 forms a key by way of a first pair of opposed slightly outwardly arcuate sides 64 and 66 spaced apart at a maximum first distance c, which is measured across the outer arucate edges of sides 64 and 66; and by way of a second pair of opposed planar sides 68 and 70 spaced apart at a record distance a. Distance c is greater than distance a. Circular hole 56 through blade member 14' has a diameter d; first distance e is slightly less than diameter d. In addition, passage 36 in side wall 20 of case 12 has a first pair of opposed surfaces 72 and 74 joined to a second pair of opposed surfaces 76 and 78. Said first pair of surfaces 72 and 74 are slightly outwardly arcuate and are spaced apart at a distance c' slightly greater than distance c of pin body 26; and second pair of surfaces 76 and 78 are planar and are spaced apart at a distance a' slightly greater than distance a of pin body 26, so that pin body 26 is adapted to be received snugly in passage 36, so that end 28 of pin body 26 is non-rotationally affixed to side wall 20 and case 12. Also, pin body 26 forms a key at distance a and c that is adapted to slide into the keyway, or slot, 58 at distance b, where distance a slides into slot 58 so that pin body 26 is rotatably positioned in circular hole 56. Distance c, as noted previously, being slightly smaller than diameter d of hole 56, allows pin body 26 to rotate freely in hole 56.

FIG. 10 of the preferred embodiment shows threaded portion as forming partial arcuate threads at the surfaces of arcuate sides 64 and 66. In turn, passage 38 is formed to accept the flat surfaces 68 and 70 in the same manner as passage 36 to be described below. It is also possible, however, that threaded portion 40 can be cylindrical in configuration and accept a full helical configuration of threads. In turn, passage 38 would then be circular in configuration slightly larger than cylindrical threaded portion 40, but the pin body 26 need be fastened to side 18 by say a weld.

Passage 36 is shown in isolation in FIG. 9. There passage 36 is shown with opposed planar surfaces 76 and 78 aligned at an angle x relative to a plane parallel to bottom wall 22 measured towards rear wall 24. As shown in the preferred embodiment and most particularly in FIGS. 8 and 11A, angle x ranges from approximately 30 degrees to about 50 degrees measured upwardly relative to rear wall 24 and is indicated by arrow 79.

Figure 12:
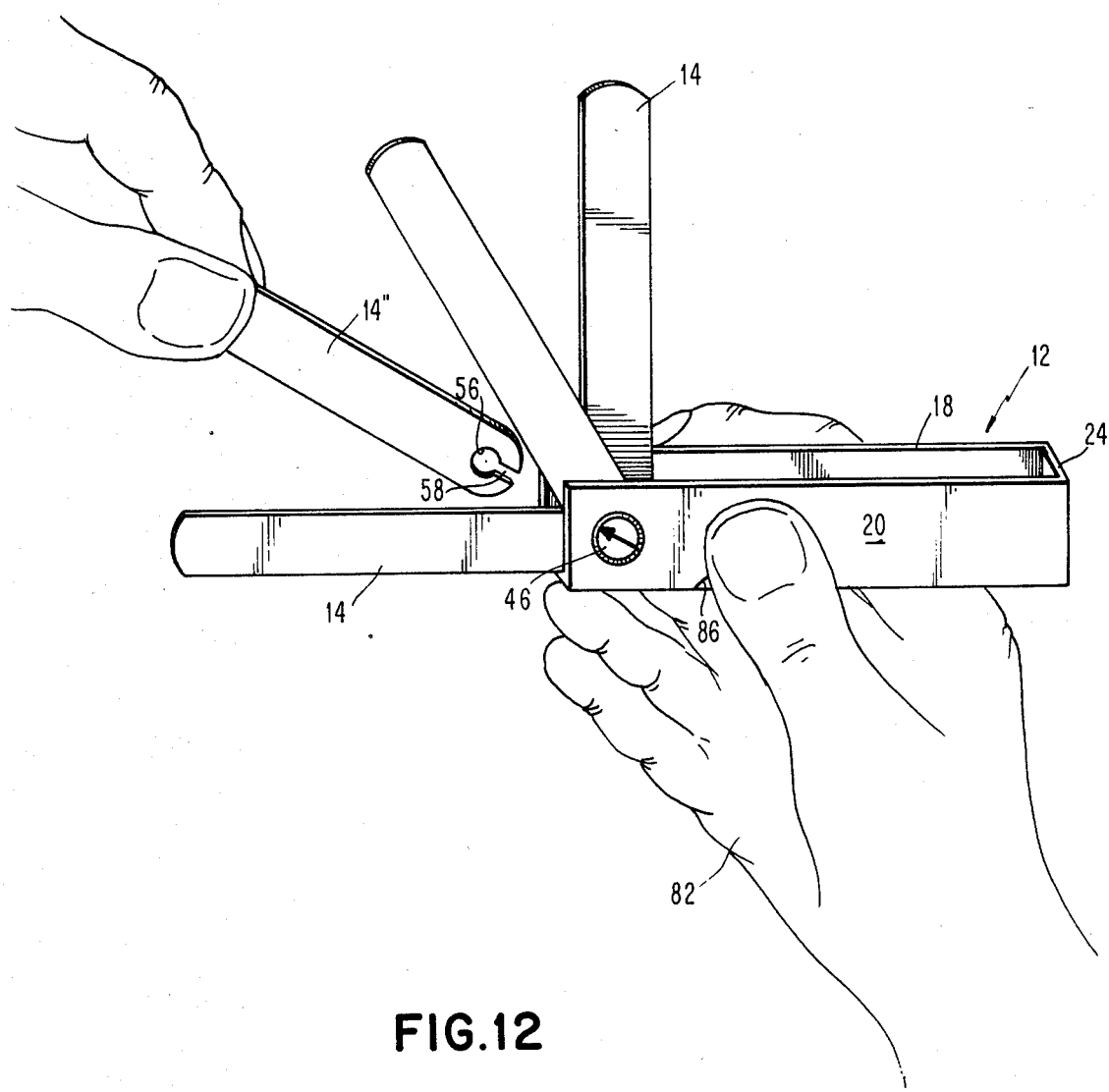
FIG. 12 is a perspective view showing one blade being removed from the case.

A brief digression will be made here regarding the significance of angle x. Reference is made to FIG. 8 where angle x, as stated, about 30 degrees as measured relative to rear wall 24 so that blades 14 which are generally held singly, doubly, triply, and so on in alignment and are generally thrust forward in measuring action by the user, somewhat in the manner of FIGS. 5 and 12, that is where blades 14 are extended at about 180 degrees from their position in case 12 as measured from rear wall 24. Angle x is not desirable at 180 degrees since blades 14 may have some tendency to slide from pin body; or key 26. A particularly desirable angle, as noted, would be the about 30-50 degrees relative to rear wall 24, since such angles would not be at an action position and yet would provide good side holding power and it is a convenient angle for a user to withdraw or insert blades 14 as needed. Angle x however, can in fact be any angle above 10 degrees relative to bottom wall 22 and 180 degrees. As shown in FIG. 12, an arrow marked on head 46 indicates position of the angle of key or pin body 26 as being approximately 120 measured from rear wall 24. As shown in FIG. 12, a user is shown positioning selected blade members 14 for removal from case 12. As an aid to removal of selected blade members 14, a pair of cutouts 84 and 86 are formed in side walls 18 and 20, respectively, at bottom wall 22 of case 12 so that a user can push blade members 14 upwards in case 13 and the blade member may be grasped as they pass the top plane of the side walls 18 and 20. At the preselected angle x, selected blade members 14″ may be withdrawn from the plurality of blade members 14. FIG. 12 shows the former position of blade member 14″ being withdrawn from pin body 26 and case 14 phantom lines. As many individual blade members 14″ as desired may be withdrawn from the blade pack 14 or, on the other hand, may be placed in the same manner onto pin body 26 with the blade member pack 14. When blade members 14 are aligned at any other angle than the preselected angle x, those blade members cannot be withdrawn from keyway, or slot 58.

FIG. 11A shows yet another embodiment where a case 88 comprises only opposed side walls 90 and 92 joined together by pin 94, which in turn rotatably holds blade members 14 in the same manner as discussed previously as related to FIGS. 7-12. FIG. 11A is a broken perspective showing yet another embodiment where side walls 90 and 92 continue as side walls 90′ and 92′ which are connected by cross-piece 96 at the end portions of 90′ and 92′ opposite pin 94. Side walls 90 and 92 are flexible, and as pin 94 is tightened via a nut (not shown), side walls 90 and 92 press in on the blade pack (indicated by single blade 14 in phantom in FIG. 11A) to aid in holding the blades in position in case 88 so that they are pressed in position even as any blade 14 passes slot 58 at its aligned keying angle x, so that a blade 14 must be urged to leave its rotational position relative to pin body 26. FIG. 11B shows sides 90′ and 92′ joined at their rear portions by bridge 98.

The embodiment of the invention particularly disclosed and described herein above is presented merely as an example of the invention. Other embodiments, forms and modifications of the invention coming within the proper scope and spirit of the appended claims will, of course, readily suggest themselves to those skilled in the art.

I claim:

1. A feeder gage mounting system comprising in combination:

a case having a pair of flexible opposed walls, a pin including an elongated pin body having opposed first and second ends, said first end being non-rotatably affixed to one of said walls, means for connecting said second end of said pin body to the other of said walls and for flexing said other wall towards said one wall whereby said opposed walls are pressed against said plurality of blade members, and a plurality of blade members, each of said blade members being a flat, elongated member having opposed blade end portions, each said blade member forming an approximately circular hole spaced proximate to one of said blade end portions, said hole being adapted to accept said elongated pin body in rotatable association, each of said blade members forming a slot joining said one end portion and said circular hole adapted to pass said pin body into a rotatable connection with said blade members at said hole and from rotatable connection with said blade members at said hole, said elongated pin body having a first pair of opposed sides spaced apart at a maximum first distance joining a second pair of opposed sides spaced apart at a second distance, said second pair of sides being planar, said first distance being greater than said second distance, said first distance being slightly less than the diameter of said hole, said slot having opposed planar surfaces spaced apart at a third distance slightly greater than said second distance and less than said first distance of said opposed sides of said pin body, whereby said pin body can be slid into and from said circular hole.

2. A feeler gage mounting system in accordance with claim 1, wherein said one of said walls of said case forms a passage having a first pair of opposed surfaces and a second pair of opposed surfaces, said second pair of surfaces joining said first pair of surfaces, said first and second pairs of surfaces being spaced apart at distances slightly greater than said first and second distances respectively of said pin body, wherein said pin body is adapted to be received snugly in said passage.

3. A feeler gage mounting system in accordance with claim 2, wherein said case has a bottom wall affixed at approximately right angles to said pair of opposed walls, said case being elongated and having opposed case end portions, said passage being formed proximate to one of said case end portions, said case being adapted to receive said plurality of blade members wherein said blade members fit snugly between said side walls against said bottom wall between said case end portions.

4. A feeler gage mounting system in accordance with claim 3, wherein said bottom wall of said case lies in a first plane and said second pair of opposed surfaces lie in a pair of parallel second planes, said pair of second planes being aligned at an angle with said first plane, said angle lying between approximately 5 degrees and 180 degrees measured relative to the other of said case end portions.

5. A feeler gage mounting system in accordance with claim 4, wherein said angle ranges from approximately 30 degrees to about 60 degrees.

6. A feeler gage mounting system in accordance with claim 5, wherein said pin is provided with a head connected to said pin body, said head being positioned on the outside surface of said one wall of said case, said head having a mark aligned approximately at said angle, whereby a user is directed to said angle at which said blade members can be removed from the pin member by way of said keyway.

7. A feeler gage mounting system in accordance with claim 6, said case further including an end wall secured to said side walls and to said bottom wall.

8. A feeler gage mounting system in accordance with claim 7, wherein said side walls of said case form opposing cutouts adjoining said bottom wall, whereby a user can press said blade members from said case.

9. A feeler gage mounting system in accordance with claim 1, wherein said means for connecting said second end of said pin body to said other of said walls of said case includes said second end being provided with a threaded portion and said other wall forming a hole adapted to pass said threaded portion; said means for connecting further including a threaded nut adapted to be screwed onto said threaded portion at the outer surface of said other wall.

* * * * *